United States Patent
Nose et al.

(10) Patent No.: US 10,760,510 B2
(45) Date of Patent: Sep. 1, 2020

(54) CONTROLLER AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Yuki Nose, Kasugai (JP); Takashi Nakamura, Toyota (JP); Keiichi Myojo, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 12 days.

(21) Appl. No.: 16/132,899

(22) Filed: Sep. 17, 2018

(65) Prior Publication Data
US 2019/0093578 A1 Mar. 28, 2019

(30) Foreign Application Priority Data
Sep. 27, 2017 (JP) ................. 2017-186390

(51) Int. Cl.
| | |
|---|---|
| *F02D 41/02* | (2006.01) |
| *F01N 9/00* | (2006.01) |
| *F02D 41/30* | (2006.01) |
| *F02D 41/00* | (2006.01) |
| *F01N 3/10* | (2006.01) |

(Continued)

(52) U.S. Cl.
CPC .......... *F02D 41/029* (2013.01); *F01N 3/021* (2013.01); *F01N 3/101* (2013.01); *F01N 9/002* (2013.01); *F02D 41/008* (2013.01); *F02D 41/0082* (2013.01); *F02D 41/0085* (2013.01); *F02D 41/025* (2013.01); *F02D 41/1408* (2013.01); *F02D 41/1475* (2013.01); *F02D 41/3005* (2013.01); *F01N 2430/06* (2013.01); *F01N 2900/08* (2013.01); *F01N 2900/1606* (2013.01);

(Continued)

(58) Field of Classification Search
CPC combination set(s) only.
See application file for complete search history.

(56) References Cited

U.S. PATENT DOCUMENTS 7,503,312 B2 * 3/2009 Surnilla .............. F02D 41/0082
 123/198 F
9,347,359 B2 * 5/2016 LaPointe ................... F01N 3/30
(Continued)

FOREIGN PATENT DOCUMENTS

| EP | 2 511 491 A1 | 10/2012 |
| EP | 3 208 450 A1 | 8/2017 |

(Continued)

*Primary Examiner* — Binh Q Tran
(74) *Attorney, Agent, or Firm* — Finnegan, Henderson, Farabow, Garrett & Dunner, LLP (57) ABSTRACT

A controller for an internal combustion engine is configured to execute a dither control process and an enlarging process. The enlarging process includes at least one of the following two processes: a process of causing an operation region of the internal combustion engine in which the dither control process is executed to be larger in a case in which an amount of particulate matter trapped by the filter is large than in a case in which the amount is small; and a process of causing a degree of richness of the rich combustion cylinder and a degree of leanness of the lean combustion cylinder to be greater in a case in which the amount of particulate matter trapped by the filter is large than in a case in which the amount of particulate matter trapped by the filter is small.

6 Claims, 5 Drawing Sheets

(51) Int. Cl.
*F02D 41/14* (2006.01)
*F01N 3/021* (2006.01)
(52) U.S. Cl.
CPC .. *F02D 2200/0812* (2013.01); *F02D 2200/10* (2013.01)

(56) References Cited

U.S. PATENT DOCUMENTS

| | | | | |
|---|---|---|---|---|
| 9,512,793 | B2* | 12/2016 | Toner | F01N 3/101 |
| 9,657,663 | B2* | 5/2017 | Santillo | F01N 3/08 |
| 10,174,696 | B2* | 1/2019 | Kido | F01N 3/2033 |
| 2017/0306893 | A1* | 10/2017 | Leone | B60K 6/365 |
| 2018/0156098 | A1 | 6/2018 | Miyaji et al. | |

FOREIGN PATENT DOCUMENTS

| | | |
|---|---|---|
| FR | 2 920 030 A3 | 2/2009 |
| JP | 2004-218541 | 8/2004 |
| JP | 2007-297949 A | 11/2007 |
| JP | 2016-136011 | 7/2016 |

* cited by examiner

CONTROLLER AND CONTROL METHOD FOR INTERNAL COMBUSTION ENGINE

CROSS REFERENCE TO RELATED APPLICATION

This application claims priority from Japanese Patent Application No. 2017-186390, filed on Sep. 27, 2017, the disclosure of which is incorporated herein by reference in its entirety.

BACKGROUND

The present disclosure relates to a controller configured to control an internal combustion engine that includes a filter configured to trap particulate matter in exhaust gas discharged from cylinders and fuel injection valves provided for the respective cylinders.

For example, Japanese Laid-Open Patent Publication No. 2004-218541 discloses a controller that executes a dither control process. In the dither control, when there is a requirement for an increase in the temperature of a catalyst device (catalyst), the air-fuel ratio is made richer than the stoichiometric air-fuel ratio in some cylinders, while the air-fuel ratio is made leaner than the stoichiometric air-fuel ratio in the other cylinders.

Japanese Laid-Open Patent Publication No. 2016-136011 discloses a configuration in which a gasoline particulate filter provided in the exhaust passage of an internal combustion engine traps particulate matter (PM) in the exhaust gas, and the PM trapped by the gasoline particulate filter is burned off (See paragraph 0002).

SUMMARY

The inventors examined the use of dither control to burn PM trapped in a filter. In that case, in order to burn the PM, it is necessary to control the temperature of the filter to a temperature higher than that required to warm up the catalyst. For this reason, it is necessary to increase the temperature increasing performance of the dither control or perform the dither control only in the operation region where the exhaust temperature is originally high without the execution of the dither control. When increasing the degree of richness and the degree of leanness to increase the temperature increasing performance, the rotational fluctuation of the crankshaft of the internal combustion engine is likely to increase. Therefore, in order to suppress the increase in the rotational fluctuation, the dither control is required to be executed only at the operating points at which the rotational fluctuation is small despite the increase in the degree of richness and the degree of leanness or the operating points at which the exhaust temperature is originally high. However, if such a requirement is satisfied, the frequency of the occurrence of the operating point suitable for executing the dither control may be reduced depending on the manner in which the internal combustion engine operates. Accordingly, the amount of PM trapped by the filter may become excessive.

Example 1

One aspect provides a controller configured to control an internal combustion engine. The internal combustion engine includes a filter configured to trap particulate matter in exhaust gas discharged from a plurality of cylinders and fuel injection valves provided for the respective cylinders. The controller is configured to execute a dither control process of operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio. The controller is configured to execute an enlarging process, which includes at least one of the following two processes: a process of causing an operation region of the internal combustion engine in which the dither control process is executed to be larger in a case in which an amount of particulate matter trapped by the filter is large than in a case in which the amount is small; and a process of causing a degree of richness of the rich combustion cylinder and a degree of leanness of the lean combustion cylinder to be greater in a case in which the amount of particulate matter trapped by the filter is large than in a case in which the amount of particulate matter trapped by the filter is small.

In the enlarging process, the process of causing the operation region of the internal combustion engine in which the dither control process is executed to be larger increases the frequency of the execution of the dither control process for the filter regeneration process. Thus, since the operation region is made larger in a case in which the amount of trapped particulate matter is large than in a case in which the amount is small, it is possible to prevent the amount of the particulate matter trapped by the filter from from being excessively large while limiting enlargement of the operation region in which the dither control is executed despite a small amount of the trapped particulate matter. Also, in the enlarging process, the process of causing the degree of richness of the rich combustion cylinder and the degree of leanness of the lean combustion cylinder to be greater raises the temperature of the filter as compared with a case in which the degree of richness and the degree of leanness are not increased. Thus, since the degree of richness and the degree of leanness are made greater in a case in which the amount of the trapped particulate matter is large than in a case in which the amount is small, it is possible to prevent the amount of the particulate matter trapped by the filter from from being excessively large while limiting execution of the dither control process in which the degree of richness and the degree of leanness are made larger despite a small amount of the trapped particulate matter.

Example 2

In the controller for an internal combustion engine of Example 1, the controller is configured to execute the dither control process in a case in which the amount of the trapped particulate matter is a first amount, an engine speed is a first engine speed, and a load of the internal combustion engine is a first load. The controller is configured to prevent the execution of the dither control process in a case in which the amount of the trapped particulate matter is the first amount, the engine speed is the first engine speed, and the load of the internal combustion engine is a second load, which is smaller than the first load. The enlarging process includes a process of executing the dither control process while causing the degree of richness of the rich combustion cylinder and the degree of leanness of the lean combustion cylinder to be greater in a case in which the amount of the trapped particulate matter is a second amount, which is larger than the first amount, the engine speed is the first engine speed, and the load of the internal combustion engine is the second load than in the case of the dither control process at the first engine speed and the first load.

In the above-described configuration, when the amount of the trapped particulate matter is the second amount, the controller executes the dither control process also at the second load. Since the second load is smaller than the first load, the exhaust temperature tends to decrease. Thus, in the above-described configuration, the controller causes the degree of richness of the rich combustion cylinder and the degree of leanness of the lean combustion cylinder to be larger in a case in which the dither control process is executed at the second load than in the case of the first load. Accordingly, as compared with a case in which the degree of richness and the degree of leanness are not increased, it is possible to increase the temperature increasing performance of the dither control, so that the particulate matter trapped by the filter is reliably burned off at the second load.

Example 3

In the controller for an internal combustion engine of Example 2, the controller is configured to execute, prior to executing the dither control process in a case in which the engine speed is the first ending speed and the load of the internal combustion engine is the second load, a notification process of operating a notification device to notify a possibility that a rotational fluctuation of a crankshaft of the internal combustion engine may increase.

Since the degree of richness of the rich combustion cylinder and the degree of leanness of the lean combustion cylinder are larger in a case in which the dither control process is executed at the second load than in a case in which the dither control process is executed at the first load, the rotational fluctuation of the crankshaft of the internal combustion engine is likely to increase. Thus, the above-described configuration causes the notification device to notify a possibility that the rotational fluctuation may increase, thereby preventing the user from experiencing a feeling of strangeness.

Example 4

In the controller for an internal combustion engine of Example 2 or 3, the controller is configured to prohibit the dither control process in a case in which the amount of the trapped particulate matter is the second amount, the engine speed is the first engine speed, and the load of the internal combustion engine is a third load, which is smaller than the second load. The controller is configured to execute, as the enlarging process, a process of executing the dither control process while causing the degree of richness of the rich combustion cylinder and the degree of leanness of the lean combustion cylinder to be greater in a case in which the amount of the trapped particulate matter is a third amount, which is larger than the second amount, the engine speed is the first engine speed, and the load of the internal combustion engine is the second load than in the case of the dither control process at the first engine speed and the second load.

In the above-described configuration, when the amount of the trapped particulate matter is the third amount, the controller executes the dither control process also at the third load. Since the third load is smaller than the second load, the exhaust temperature tends to decrease. Thus, in the above-described configuration, the controller causes the degree of richness of the rich combustion cylinder and the degree of leanness of the lean combustion cylinder to be larger in a case in which the dither control process is executed at the third load than in the case of the second load. Accordingly, as compared with a case in which the degree of richness and the degree of leanness are not increased, it is possible to increase the temperature increasing performance of the dither control, so that the particulate matter trapped by the filter is reliably burned off at the third load.

Example 5

Another aspect provides a method of controlling an internal combustion engine. The internal combustion engine includes a filter configured to trap particulate matter in exhaust gas discharged from a plurality of cylinders and fuel injection valves provided for the respective cylinders. The method includes executing a dither control process of operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio. The method includes executing an enlarging process, which includes at least one of the following two processes: a process of causing an operation region of the internal combustion engine in which the dither control process is executed to be larger in a case in which an amount of particulate matter trapped by the filter is large than in a case in which the amount is small; and a process of causing a degree of richness of the rich combustion cylinder and a degree of leanness of the lean combustion cylinder to be greater in a case in which the amount of particulate matter trapped by the filter is large than in a case in which the amount of particulate matter trapped by the filter is small.

Example 6

A further aspect provides a controller configured to control an internal combustion engine. The internal combustion engine includes a filter configured to trap particulate matter in exhaust gas discharged from a plurality of cylinders and fuel injection valves provided for the respective cylinders. The processing circuitry is configured to execute a dither control process of operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio. The processing circuitry is configured to execute an enlarging process, which includes at least one of the following two processes: a process of causing an operation region of the internal combustion engine in which the dither control process is executed to be larger in a case in which an amount of particulate matter trapped by the filter is large than in a case in which the amount is small; and a process of causing a degree of richness of the rich combustion cylinder and a degree of leanness of the lean combustion cylinder to be greater in a case in which the amount of particulate matter trapped by the filter is large than in a case in which the amount of particulate matter trapped by the filter is small.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings.

DETAILED DESCRIPTION

A controller for an internal combustion engine according to one embodiment will now be described with reference to the drawings.

Figure 1:
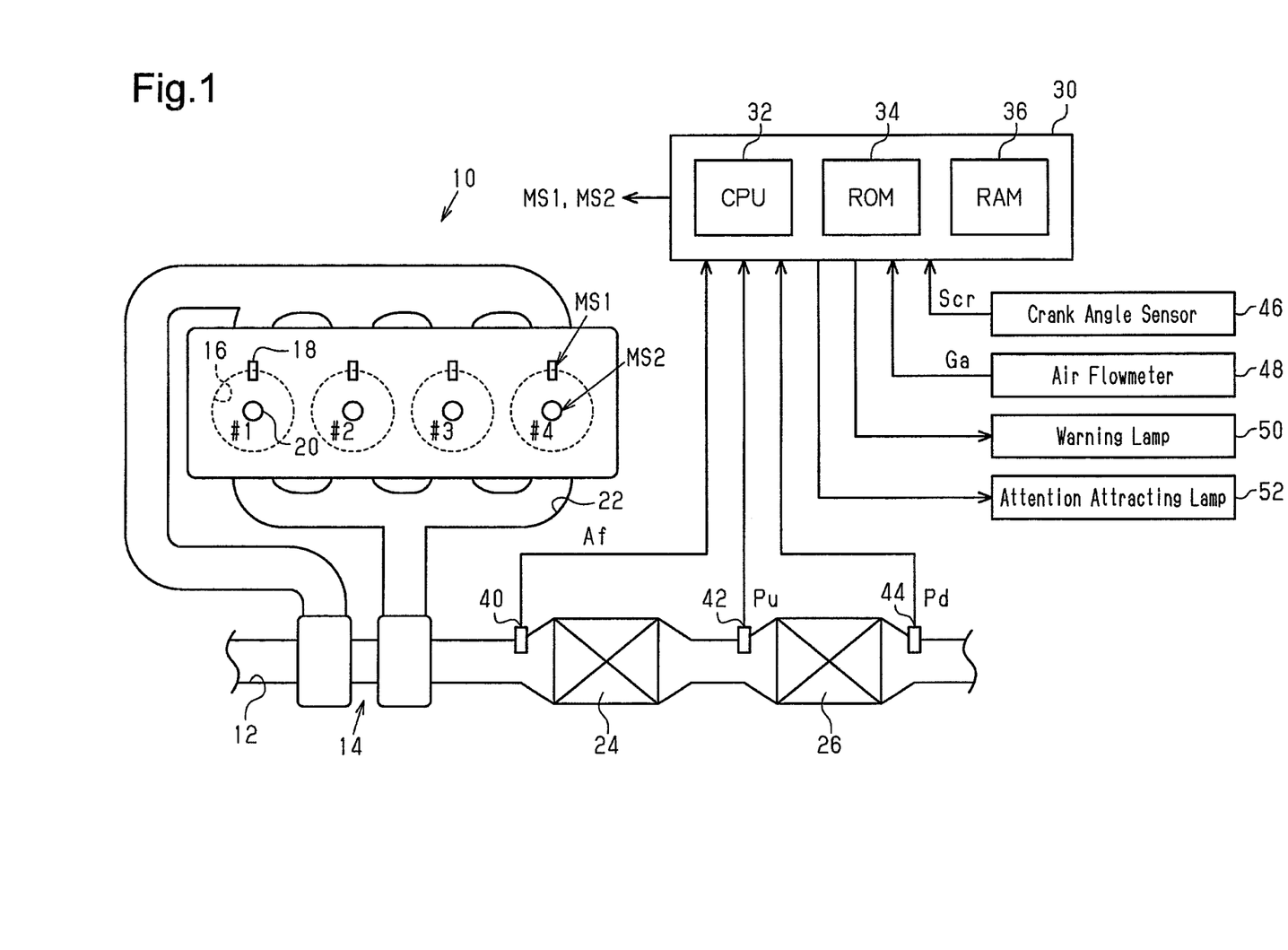
FIG. 1 is a diagram of an internal combustion engine and a controller of the engine according to one embodiment.

In an internal combustion engine 10 shown in FIG. 1, the air drawn in from an intake passage 12 flows into combustion chambers 16 of respective cylinders #1 to #4 via a forced-induction device 14. Each of the cylinders #1 to #4 is provided with a fuel injection valve 18 configured to inject fuel and an ignition device 20 configured to generate spark discharge. In the combustion chamber 16, air-fuel mixture is used for combustion, and the air-fuel mixture used for combustion is exhausted to an exhaust passage 22 as exhaust gas. A three-way catalyst 24 having an oxygen storage capacity is provided in a section of the exhaust passage 22 that is downstream of the forced-induction device 14. Further, a gasoline particulate filter (GPF 26) is provided downstream of the three-way catalyst 24 in the exhaust passage 22.

A controller 30 controls the internal combustion engine 10 and controls the controlled portions of the engine 10 such as the fuel injection valves 18 and the ignition devices 20, thereby controlling the controlled amounts (the torque, exhaust components, and the like). At this time, the controller 30 refers to an air-fuel ratio Af detected by an air-fuel ratio sensor 40 on the upstream side of the three-way catalyst 24, the pressure on the upstream side of the GPF 26 detected by an upstream-side pressure sensor 42 (upstream-side pressure Pu), and the pressure on the downstream side of the GPF 26 detected by a downstream-side pressure sensor 44 (downstream-side pressure Pd). Further, the controller 30 refers to an output signal Scr of a crank angle sensor 46 and an intake air amount Ga detected by an air flowmeter 48. The controller 30 includes a CPU 32, a ROM 34, and a RAM 36 and executes control of the above-described controlled amounts by executing programs stored in the ROM 34 using the CPU 32.

Figure 2:
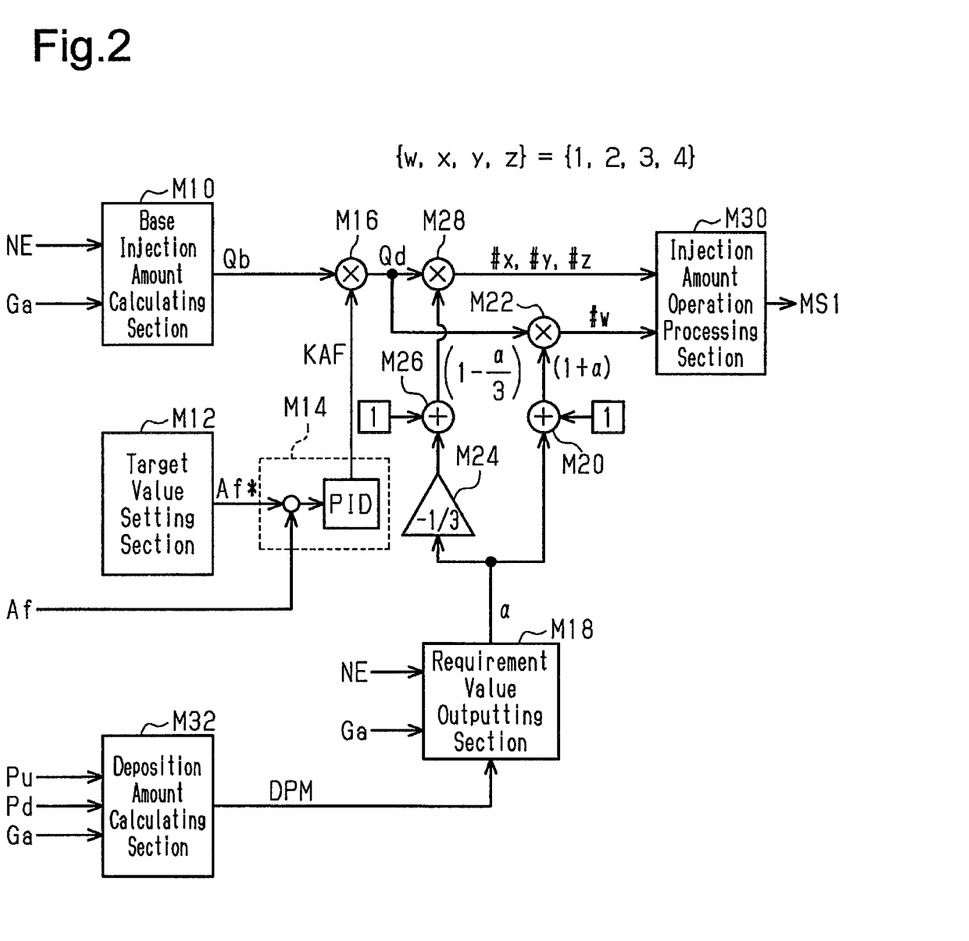
FIG. 2 is a block diagram showing part of a process executed by the controller of the embodiment.

FIG. 2 shows part of the process that is implemented by the CPU 32 executing programs stored in the ROM 34.

Based on the intake amount Ga and the engine speed NE, which is calculated based on the output signal Scr of the crank angle sensor 46, a base injection amount calculating section M10 calculates a base injection amount Qb, which is an operation amount for executing open-loop control to cause the air-fuel ratio of the air-fuel mixture in the combustion chamber 16 to be a target air-fuel ratio.

A target value setting section M12 sets a target value Af* of the feedback control amount that is used to control the air-fuel ratio of the air-fuel mixture in the combustion chamber 16 to be the target air-fuel ratio.

A feedback section M14 calculates a feedback operation amount KAF, which is an operation amount used to execute feedback control to cause the air-fuel ratio Af, which is a feedback control amount, to be the target value Af*. In the present embodiment, the feedback operation amount KAF is the sum of the output values of a proportional element that has, as the input, the difference between the target value Af* and the air-fuel ratio Af, an integral element, and a differential element.

A feedback correcting section M16 corrects the base injection amount Qb by multiplying the base injection amount Qb by the feedback operation amount KAF, thereby calculating a required injection amount Qd.

A requirement value outputting section M18 calculates and outputs a correction requirement value $\alpha$ used in dither control, in which the air-fuel ratios of the air-fuel mixture to be burned are differentiated among the cylinders, while the components of the entire exhaust gas discharged from the respective cylinders #1 to #4 of the internal combustion engine 10 are made equivalent to that in the case in which the air-fuel ratios of the air-fuel mixture to be burned in all the cylinders #1 to #4 are set to the target air-fuel ratio. In the dither control according to the present embodiment, one of the first to fourth cylinders #1 to #4 is a rich combustion cylinder, in which the air-fuel ratio is made richer than the stoichiometric air-fuel ratio, and the remaining three cylinders are lean combustion cylinders, in which the air-fuel ratio is leaner than the stoichiometric air-fuel ratio. The injection amount in the rich combustion cylinder is calculated by multiplying the required injection amount Qd by a value $(1+\alpha)$. The injection amount in each lean combustion cylinder is calculated by multiplying the required injection amount Qd by a value $(1-(\alpha/3))$. With the above-described setting of the injection amounts for the lean combustion cylinders and the rich combustion cylinder, if the amounts of air filling the cylinders #1 to #4 are the same, the components of the entire exhaust gas discharged from the respective cylinders #1 to #4 of the engine 10 can be made equivalent to those in a case in which the air-fuel ratios of the air-fuel mixture to be burned in all the cylinders #1 to #4 are equal to the target air-fuel ratio. With the above-described setting of the injection amounts, if the amounts of air filling the cylinders #1 to #4 are the same, the reciprocal of the mean value of the fuel-air ratios of the air-fuel mixture to be burned in the cylinders is the target air-fuel ratio. The fuel-air ratio is the reciprocal of the air-fuel ratio.

The requirement value outputting section M18 sets the correction requirement value $\alpha$ to a value greater than 0 when a temperature increase requirement of the GPF 26 arises. As a result, the oxygen discharged from the lean combustion cylinders is stored in the three-way catalyst 24, and the oxygen reacts with the unburned fuel components discharged from the rich combustion cylinder, which increases the exhaust temperature. The high-temperature exhaust gas eventually increases the temperature of the GPF 26, downstream of the three-way catalyst 24.

A correction coefficient calculating section M20 adds the correction requirement value $\alpha$ to 1 to calculate the correction coefficient for the required injection amount Qd related to the rich combustion cylinder. A dither correcting section M22 multiplies the required injection amount Qd by the correction coefficient $(1+\alpha)$ to calculate the injection amount command value for the cylinder # w that is designated as a rich combustion cylinder. In this case, w refers to any of 1 to 4.

A multiplication section M24 multiplies the correction requirement value $\alpha$ by $-\frac{1}{3}$. A correction coefficient calculating section M26 adds the output value of the multiplication section M24 to 1 to calculate the correction coefficient for the required injection amount Qd related to each lean combustion cylinder. A dither correcting section M28 multiplies the required injection amount Qd by the correction coefficient $(1-(\alpha/3))$ to calculate the injection amount command value Q1* for the cylinders # x, # y, and # z, which are designated as lean combustion cylinders. In this case, x, y, z are each any of 1 to 4, and w, x, y, z are all different. The rich combustion cylinder is desirably Changed among the cylinders #1 to #4 with a period longer than one combustion cycle.

The injection amount controlling section M30 generates an operation signal MS1 for the fuel injection valve 18 of the cylinder # w designated as the rich combustion cylinder based on the injection amount command value output by the dither correcting section M22 and outputs the signal MS1 to the same fuel injection valve 18, thereby operating the fuel injection valve 18 such that the amount of fuel injected from the fuel injection valve 18 becomes the amount corresponding to the injection amount command value. Also, the injection amount controlling section M30 generates an operation signal MS1 for the fuel injection valves 18 of the cylinders # x, # y, and # z designated as the lean combustion cylinders based on the injection amount command value output by the dither correcting section M28 and outputs the signal MS1 to the same fuel injection valves 18, thereby operating the fuel injection valves 18 such that the amount of fuel injected from the fuel injection valves 18 becomes the amount corresponding to the injection amount command value.

A deposition amount calculating section M32 calculates and outputs the amount of PM trapped in the GPF 26 (PM deposition amount DPM) based on the upstream-side pressure Pu, the downstream-side pressure Pd, and the intake air amount Ga. The deposition amount calculating section M32 sets the PM deposition amount DPM to a greater value when the differential pressure obtained by subtracting the downstream-side pressure Pd from the upstream-side pressure Pu is high than when the differential pressure is low. Also, the deposition amount calculating section M32 sets the PM deposition amount DPM to a smaller value when the intake air amount Ga is large than when the intake air amount Ga is small. Specifically, the ROM 34 stores map data in which the differential pressure and the intake air amount Ga are input variables, and the PM deposition amount DPM is an output variable, and the CPU 32 calculates the PM deposition amount DPM by using the map data. The map data refers to a data set of discrete values of input variables and values of output variables each corresponding to a value of the input variables. When the value of an input variable matches any of the values of the input variable on the map data; the map calculation uses the value of the corresponding output variable on the map data as the calculation result. When the value of the input variable does not match any of the values of the input variable on the map data, the map calculation uses a value obtained by interpolation of multiple values of the output variable included in the map data set as the calculation result.

The requirement value outputting section M18 sets the correction requirement value $\alpha$ to a value greater than 0 to execute a filter regeneration process of burning the PM trapped in the GPF 26 in accordance with the PM deposition amount DPM. This process will hereinafter be described.

Figure 3:
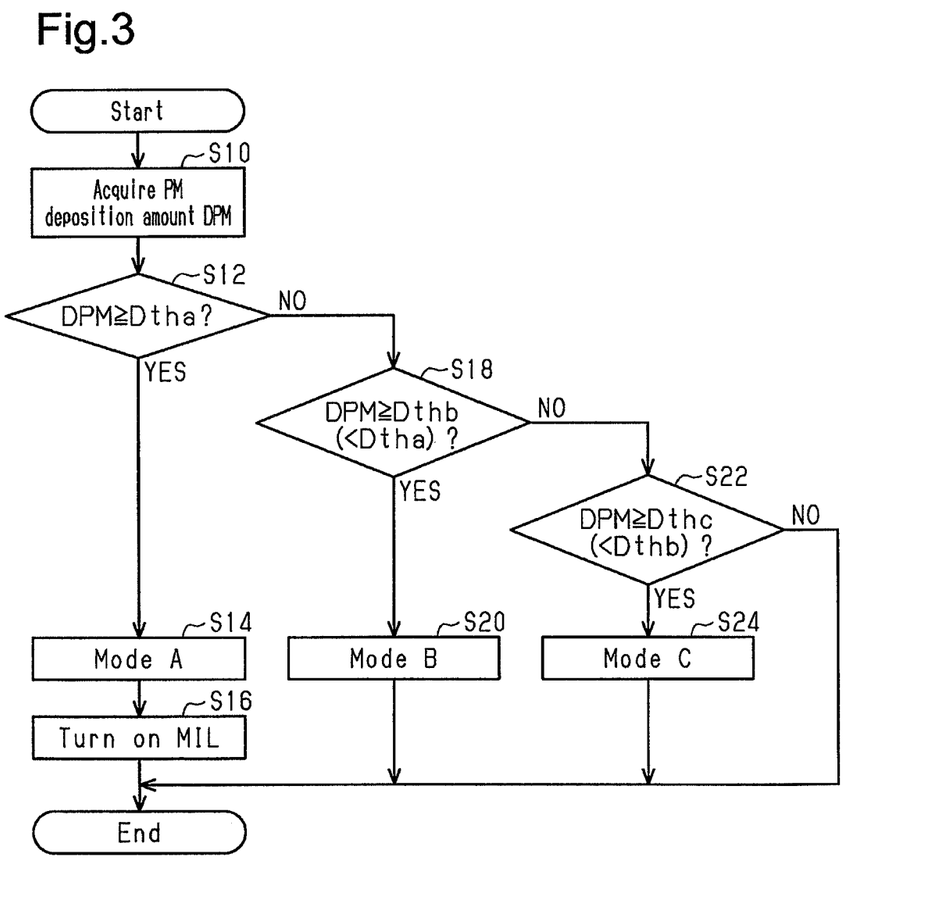
FIG. 3 is a flowchart showing the procedure of a process executed by a requirement value outputting section according to the embodiment.

FIG. 3 shows the procedure of the process executed by the requesting value outputting section M18. The process shown in FIG. 3 is executed by the CPU 32 repeatedly executing programs stored in the ROM 34 at a predetermined interval. In the following description, the number of each step is represented by the letter S followed by a numeral.

In the series of processes shown in FIG. 3, the CPU 32 first acquires the PM deposition amount DPM (S10). Then, the CPU 32 determines whether the PM deposition amount DPM is greater than or equal to a threshold value Dtha (S12). The threshold value Dtha is set to a value at which the PM deposition amount DPM is considerably large, and if the PM is left untreated, there is a possibility of hindering the operation of the internal combustion engine 10. When determining that the PM deposition amount DPM is larger than or equal to the threshold value Dtha (S12: YES), the CPU 32 sets the current mode to mode A, which is a mode indicating the state where the execution of the filter regeneration process is most strongly desired (S14). Then, the CPU 32 operates a warning lamp 50 shown in FIG. 1 to execute a process of urging the user of the vehicle equipped with the internal combustion engine 10 to have a filter regeneration process executed at the repair shop due to a large value of the PM deposition amount DPM (S16).

In contrast, when determining that the PM deposition amount DPM is smaller than the threshold value Dtha (S12: NO), the CPU 32 determines whether the PM deposition amount DPM is larger than or equal to a threshold value Dthb, which is smaller than the threshold value Dtha (S18). The threshold value Dthb is set to a value at which, although the operation of the engine 10 will not be hindered if the deposition of the particulate matter is left untreated for a relatively short time, the filter regeneration process is desirable. When determining that the PM deposition amount DPM is larger than or equal to the threshold value Dthb (S18: YES), the CPU 32 sets the current mode to mode B, which is a mode indicating the state where the execution of the filter regeneration process is relatively strongly desired (S20).

In contrast, when determining that the PM deposition amount DPM is smaller than the threshold value Dthb (S18: NO), the CPU 32 determines whether the PM deposition amount DPM is larger than or equal to a threshold value Dthc, which is smaller than the threshold value Dthb (S22). The threshold value Dthc is set to a value at which the filter regeneration process is desired although it is not urgent. When determining that the PM deposition amount DPM is larger than or equal to the threshold value Dthc (S22: YES), the CPU 32 sets the current mode to mode C, which is the least urgent mode among the modes at which the execution of the filter regeneration process is desired (S24).

When the processes of S16, S20, S24 are completed or when the determination is negative in the process of S22, the CPU 32 temporarily ends the series of processes shown in FIG. 3.

Figure 4:
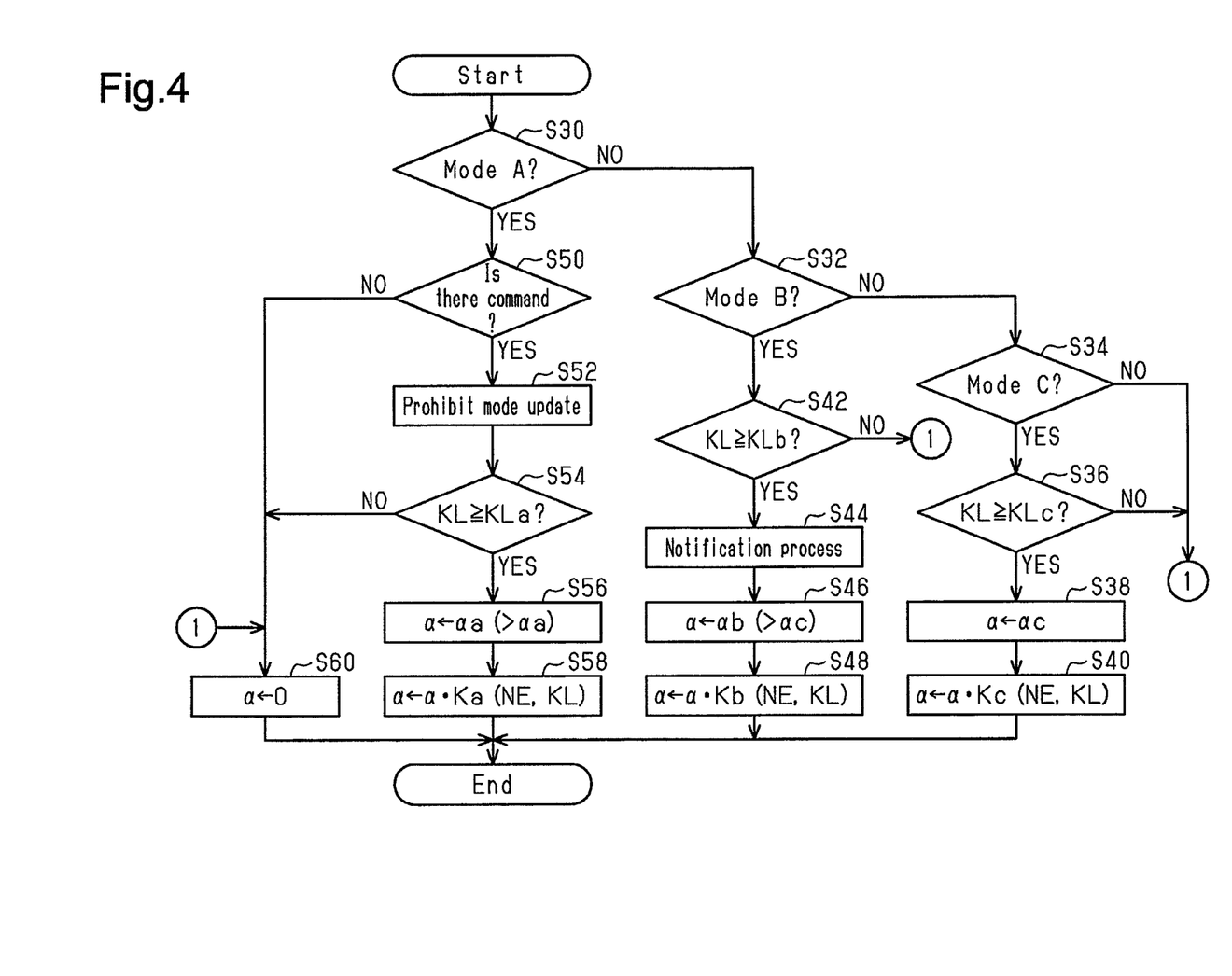
FIG. 4 is a flowchart showing the procedure of a process executed by a requirement value outputting section according to the embodiment.

FIG. 4 shows a procedure of processes different from the processes of FIG. 3 in the processes of the requirement value outputting section M18. The process shown in FIG. 4 is executed by the CPU 32 repeatedly executing programs stored in the ROM 34 at a predetermined interval. In the following, the process of FIG. 4 will be described, in which the PM deposition amount DPM gradually increases.

In the series of processes shown in FIG. 4, the CPU 32 first determines whether the current mode is mode A (S30). When determining that the current mode is not mode A (S30: NO), the CPU 32 determines whether the current mode is mode B (S32). Then, when determining that the current mode is not mode B (S32: NO), the CPU 32 determines whether the current mode is mode C (S34). Then, when determining that the current mode is mode C (S34: YES), the CPU 32 determines whether a load factor KL is greater than or equal to a threshold value KLc (S36). This process is a process of determining whether the condition for executing the dither control process in mode C is satisfied.

Figure 5:
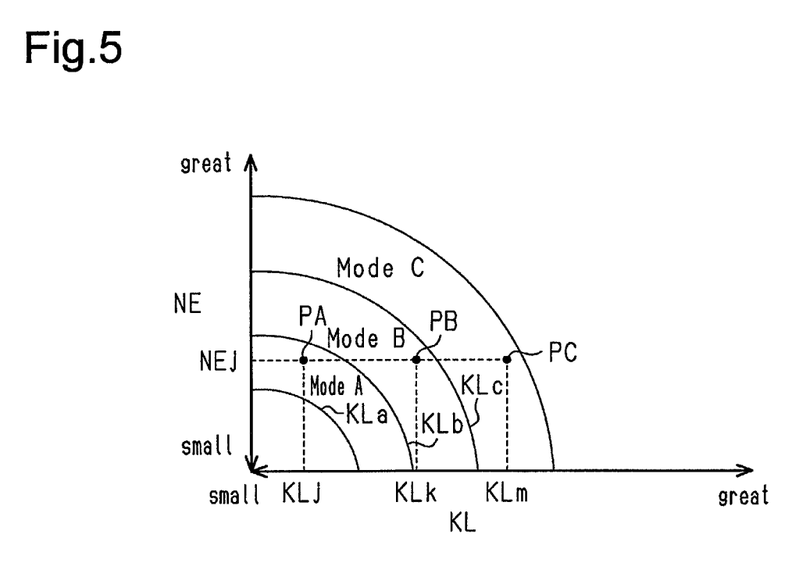
FIG. 5 is a diagram showing execution regions of the filter regeneration process in each mode according to the embodiment.

The threshold value KLc is shown in FIG. 5. As shown in FIG. 5, the threshold value KLc is set to a smaller value when the engine speed NE is high than when the engine speed NE is low. The threshold value KLc is set such that, when the load factor KL is greater than or equal to the threshold value KLc, the exhaust temperature is relatively high and the temperature of the GPF 26 becomes relatively high without executing the dither control. The threshold value KLc is set to a smaller value when the engine speed NE is high than when the engine speed NE is low for at least one of the following two reasons. The first reason is that the higher the engine speed NE, the higher becomes the frequency of the occurrence of the compression top dead center per unit time, so that the temperature increasing effect by the dither control process tends to be improved. The second reason is that when the engine speed NE is high, the rotational fluctuation of the crankshaft of the internal combustion engine 10 is less likely to increase than when the engine speed NE is low, so that the injection amount correction request value α can be easily increased.

Figure 6:
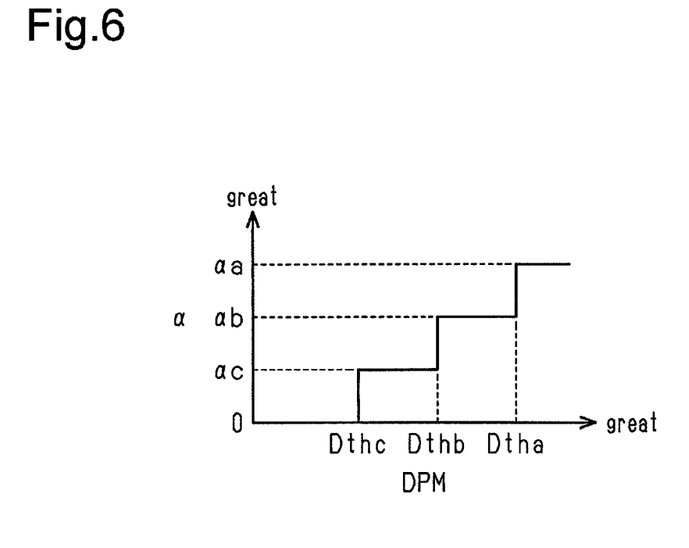
FIG. 6 is a diagram showing the setting of the correction requirement value in each mode according to the embodiment.

In the process of S36 shown in FIG. 4, the threshold value KLc is calculated from the current engine speed NE, and the calculated threshold value KLc is compared with the load factor KL. Specifically, the calculation of the threshold value KLc is performed simply by storing in the ROM 34 map data that includes an input variable, which is the engine speed NE, and an output variable, which is the threshold value KLc, and causing the CPU 32 to calculate the threshold value KLc by using the map data. When determining that the load factor KL is greater than or equal to the threshold value KLc (S36: YES), the CPU 32 substitutes the value αc shown in FIG. 6 for the correction requirement value a based on the PM deposition amount DPM (S38). The value αc is the allowable maximum value of the correction requirement value α in mode C. The vertical axis in. FIG. 6 represents the allowable maximum value of the correction requirement value α, and the horizontal axis represents the PM deposition amount DPM. As shown in FIG. 6, when the PM deposition amount DPM is large, the CPU 32 calculates the allowable maximum value of the correction requirement value α to be a greater value than when the PM deposition amount DPM is small. When the load factor KL is greater than or equal to the threshold value KLc, the value αc is set to a value at which the temperature of the GPF 26 can be raised to or above the temperature necessary for burning off the PM (for example, 600° C.)

Referring back to FIG. 4, the CPU 32 substitutes the correction requirement value α multiplied by the correction factor Kc for the correction requirement value α (S40). The CPU 32 variably sets the correction factor Kc in accordance with the operating point of the internal combustion engine 10. Specifically, the CPU 32 defines the operating point based on the engine speed NE and the load factor KL and sets the correction factor Kc to a value smaller than or equal to 1 and greater than or equal to 0 in accordance with the engine speed NE and load factor KL. For example, the CPU 32 sets the correction factor Kc to 0 when the load factor KL is excessively small. The correction factor Kc can be calculated simply by storing map data having the engine speed NE and load factor KL as input variables and the correction factor Kc as an output variable in the ROM 34 and causing the CPU 32 to perform map calculation.

As shown in FIG. 5, the dither control process in mode C is only executed in a relatively high engine speed and high load region. Thus, although relatively rare, depending on the manner in which the internal combustion engine 10 operates, the dither control process is not executed in mode C, so that the PM deposition amount DPM may reach the threshold value Dthb. In that case, the current mode is determined to be mode B.

Referring back to FIG. 4, when determining that the current mode is mode B (S32: YES), the CPU 32 determines whether the load factor KL is greater than or equal to a threshold value KLb (S42). As shown in FIG. 5, the CPU 32 sets the threshold value KLb to a smaller value when the engine speed NE is high than when the engine speed NE is low. Also, when the engine speed NE is the same, the CPU 32 sets the threshold value KLb to a value smaller than the threshold value KLc.

In the process of S42 shown in FIG. 4, the CPU 32 calculates the threshold value KLb from the current engine speed NE in the same manner as the process of S36 and compares the calculated threshold value KLb with the load factor KL. When determining that the load factor KL is greater than or equal to the threshold value KLb (S42: YES), the CPU 32 operates an attention attracting light 52 shown in FIG. 1 to execute a notification process of notifying the user in advance of a possibility that the rotational fluctuation of the crankshaft of the internal combustion engine 10 may increase (S44). Then, the CPU 32 substitutes a value αb for the correction requirement value α (S46). As shown in FIG. 6, the value αb is greater than that in mode C. Also, the value ab is set to a value at which, even if the load factor KL is smaller than the threshold value KLc, the temperature of the GPF 26 can be raised to or above the temperature required for burning off the PM through the dither control process.

Then, the CPU 32 substitutes, for the correction requirement value α, the value obtained by multiplying the correction requirement value α calculated by the process of S46 by the correction factor Kb (S48). The CPU 32 sets the correction factor Kb to a value smaller than or equal to 1 and greater than or equal 0. In particular, when the load factor KL is greater than or equal to the threshold value KLc, the CPU 32 sets the correction factor Kb to a value smaller than This setting is employed in consideration of the fact that, even if the correction requirement value α is a value αc, which is smaller than αb, when the load factor KL is greater than or equal to the threshold value KLc, the temperature of the GPF 26 can be increased to a temperature at which the PM can be burned off. When the load factor KL is greater than or equal to the threshold value KLc, it is desirable that the correction factor Kb be adjusted such that the correction requirement value α is the same value in mode C. The correction factor Kb can be calculated simply by storing map data having the engine speed NE and load factor KL as input variables and the correction factor Kb as an output variable in the ROM 34 and causing the CPU 32 to perform map calculation.

The dither control is executed in mode B when the load factor KL is greater than or equal to the threshold value KLb. Therefore, although fairly rare, depending on the manner in which the internal combustion engine 10 operates, the dither control may not be executed in mode B and the PM deposition amount DPM may reach the threshold value Dtha, so that the current mode is determined to be mode A.

When the current mode is mode A (S30: YES), the CPU 32 determines whether a command signal for the filter regeneration process has been input from outside (S50). The command signal is assumed to be a signal input from the maintenance device to the controller 30 in a state in which a dedicated troubleshooting device (maintenance device) is connected to the controller 30 at the repair shop. That is, the process of S50 is a process of determining whether it is time for the user to take the vehicle to repair shop and have a filter regeneration process executed on the vehicle. When determining that a command signal has been input (S50: YES), the CPU 32 prohibits update of the mode by the process of FIG. 3 (S52). Then, the CPU 32 determines whether the load factor KL is greater than or equal to a threshold value KLa (S54). As shown in FIG. 5, the CPU 32 sets the threshold value KLa to a smaller value as the engine speed NE increases. Also, when the engine speed NE is the same, the CPU 32 sets the threshold value KLa to a value smaller than the threshold value KLb.

In the process of S54 shown in FIG. 4, the CPU 32 calculates the threshold value KLa from the current engine speed NE in the same manner as the process of S36 and compares the calculated threshold value KLa with the load factor KL. When determining that the load factor KL is greater than or equal to the threshold value KLa (S54: YES), the CPU 32 substitutes a value αa for the correction requirement value α (S56). As shown in FIG. 6, the value αa is greater than the value αb. Also, the value αa is set to a value at which, even if the load factor KL is smaller than the threshold value KLb, the temperature of the GPF 26 can be raised to or above the temperature required for burning off the PM through the dither control process.

Then, the CPU 32 substitutes, for the correction requirement value α, the value obtained by multiplying the correction requirement value α calculated by the process of S56 by the correction factor Ka (S58). The CPU 32 sets the correction factor Ka to a value smaller than or equal to 1 and greater than or equal 0. In particular, when the load factor KL is greater than or equal to the threshold value KLb, the CPU 32 sets the correction factor Ka to a value smaller than 1. This setting is employed in consideration of the fact that, even if the correction requirement value α is a value αb, which is smaller than αa, when the load factor KL is greater than or equal to the threshold value KLb, the temperature of the GPF 26 can be increased to a temperature at which the PM can be burned off. When the load factor KL is greater than or equal to the threshold value KLb and smaller than the threshold value KLc, it is desirable that the correction factor Ka be adjusted such that the correction requirement value α is the same value in mode B. When the load factor KL is greater than or equal to the threshold value KLc, it is desirable that the correction factor Ka be adjusted such that the correction requirement value α is the same value in mode C. The correction factor Ka can be calculated simply by storing map data having the engine speed NE and load factor KL as input variables and the correction factor Ka as an output variable in the ROM 34 and causing the CPU 32 to perform map calculation.

When the determination is negative in any of the processes of S34, S36, S50, S54, the CPU 32 substitutes zero for the correction requirement value α (S60). When any of the processes of S40, S48, S58, S60 are completed, the CPU 32 temporarily ends the series of processes shown in FIG. 4.

The operation of the present embodiment will now be described.

As the PM deposition amount DPM increases, the CPU 32 changes the mode in the order of mode C, mode B, and mode A. In mode C, the CPU 32 executes dither control at the operating point PC of an engine speed NEj and a load factor KLm in FIG. 5. However, when the load factor KL is smaller than threshold value KLc, the dither control is prohibited. That is, the dither control is not executed. In contrast, in mode B, the CPU 32 executes the dither control at the operating point PB of the engine speed NEj and a load factor KLk, for example. In particular, at the operating point PB, the CPU 32 sets the correction requirement value α to a value greater than that at the operating point PC. However, in mode B, when the load factor KL is smaller than the threshold value KLb, the dither control is prohibited, that is, the dither control is not executed. In contrast, in mode A, the CPU 32 executes the dither control at the operating point PA of the engine speed NEj and a load factor KLj, for example. In particular, at the operating point PA, the CPU 32 sets the correction requirement value α to a value greater than that at the operating point PB.

The present embodiment described above further has the following advantages.

(1) As compared with mode C, a greater value is allowed as the correction requirement value α, and the dither control process is executed in a wide set of the operating points (operation region) of the internal combustion engine 10 defined by the engine speed NE and the load factor KL in mode B. This increases the frequency of the execution of the filter regeneration process and thus prevents the PM deposition amount DPM from being excessively increased.

(2) Prior to the execution of the dither control in mode B, the attention attracting light 52 is operated to inform the user that the rotational fluctuation may increase. Thus, even when the rotational fluctuation of the crankshaft of the internal combustion engine 10 increases due to the dither control, it is possible to prevent the user from experiencing a feeling of strangeness.

(3) In mode A, the warning lamp 50 is turned on. This allows the repair mechanic to input a command signal to the controller 30 with the maintenance device and execute the dither control. Therefore, when the PM deposition amount DPM is great, the GPF 26 can be reliably regenerated.

<Correspondence>

The correspondence between the items in the above embodiments and the items described in the above SUMMARY is as follows. Below, the correspondence is shown for each of the numbers in the above SUMMARY.

In Example 1, the filter corresponds to the GPF 26, and the dither control process corresponds to the processes executed by the correction factor calculating section M20, the dither correcting section M22, the multiplication section M24, the correction factor calculating section M26, the dither correcting section M28, and the injection amount operation processing section M30, and the processes of S40, S48, and S58. The enlarging process corresponds to the processes of S14, S20, S46, and S56.

In Example 2, the first engine speed corresponds to the engine speed NEj, the combination of the first amount, the second amount, the first load, and the second load corresponds to the combination of threshold value Dthc, the threshold value Dthb, the load factor KLm, and the load factor KLk, the combination of the threshold value Dthc, the threshold value value Dtha, the load factor KLm, and the load factor KLj, or the combination of the threshold value Dthb, the threshold value value Dtha, the load factor KLk, and the load factor KLj.

In Example 3, the combination of the first amount, the second amount, the first load, and the second load corresponds to the combination of the threshold value Dthc, the threshold value Dthb, the load factor KLm, the load factor KLk. The notification device corresponds to the attention attracting light 52.

In Example 4, the second amount, the third amount, the second load, and the third load correspond to the threshold value Dthb, the threshold value Dtha, the load factor KLk, and the load factor KLj, respectively.

In Example 5, the second amount corresponds to the threshold value Dtha, and the warning process corresponds to the process of S16.

Other Embodiments

At least one feature of the above-illustrated embodiment may be modified as follows.

Regarding Notification Device and Notification Process

In the above-illustrated embodiment, in mode B, the notification process is executed even when the load factor KL is greater than or equal to the threshold value KLc, but the configuration is not limited to this. For example, the notification process may be executed only when the load factor KL is smaller than the threshold value KLc and greater than or equal to the threshold value KLb in mode B. Further, for example, in mode B, the notification process may be started when the load factor KL is smaller than the threshold value KLc and greater than or equal to the threshold value KLb and may be continued as long as mode B is not canceled even after the load factor KL becomes greater than or equal to the threshold value KLc.

The notification device is not limited to the attention attracting light 52, but may be, for example, a device that outputs a verbal signal that calls for attention.

Further, the notification process does not necessarily need to be executed in mode B.

Regarding Warning Information Output Device and Warning Process

The warning information output device is not limited to the warning lamp 50, but may be a device that outputs a verbal signal for warning, for example.

As described in the section "Regarding Enlarging Process" below, mode A does not necessarily need to be provided.

Regarding Enlarging Process

Instead of using the values αa, αb, αc and the correction factors Ka, Kb, Kc, the correction requirement value α may be calculated by storing map data having a parameter indicating the operating point as an input variable and the correction requirement value α as an output variable in the ROM 34 and causing the CPU 32 to perform map calculation.

In the above-illustrated embodiment, the process of FIG. 3 is prohibited in the period in which the command signal is input. However, the configuration is not limited to this. Also, in the above-illustrated embodiment, when the PM deposition amount DPM becomes smaller than the threshold value Dthb due to the execution of the dither control process in mode B, the mode is switched to mode C. However, the configuration is not limited to this. For example, at the time of executing the dither control in mode B, the mode does not need to be changed even when the PM deposition amount DPM becomes smaller than the threshold value Dthb.

In the above-illustrated embodiment, the execution region of the filter regeneration process is enlarged in two stages in accordance with the PM deposition amount DPM. However, the configuration is not limited to this. For example, the execution region may be enlarged in one stage. In this case, for example, the process of mode C may be executed when the PM deposition amount DPM is small, and the process of mode A may be executed when the PM deposition amount DPM is large. Also, for example, the process of mode B may be executed when the PM deposition amount DPM is small, and the process of mode A may be executed when the PM deposition amount DPM is large. For example, the process of mode C may be executed when the PM deposition amount DPM is small, and the process of mode B may be executed when the PM deposition amount DPM is large. In addition, the execution region of the filter regeneration process may be enlarged in three or more stages. In this case, for example, mode B may be subdivided such that the lower the load at which the filter regeneration process is executed, the higher the level of attention attracting becomes. The level may be expressed, for example, by the color of the attention attracting light 52. The level may also be expressed by the volume, frequency, or tone of the sound in the case in which the notification device is a device that outputs a verbal signal as described in the section "Regarding Notification Device and Notification Process." However, when subdividing mode B, it is also possible to cause the execution region of the filter regeneration process in a case in which the PM deposition amount DPM is large to be larger than in a case in which the PM deposition amount DPM is small, without subdividing the notification process.

The enlarging process is not limited to the one in which the correction requirement value α is increased as the execution region of the filter regeneration process is enlarged. This modification can be implemented by setting the correction requirement value α in the case in which the load factor KL is greater than or equal to the threshold value KLb and smaller than the threshold value KLc to a value that can increase the temperature of the GPF 26 to a temperature required to burn PM through the dither control even if the load factor KL is greater than or equal to the threshold value KLa and smaller than the threshold value KLb. In this case, for example, if the burning tends to be unstable in a case in which the load factor KL is greater than or equal to the threshold value KLa and smaller than the threshold value KLb as compared with a case in which the load factor KL is greater than or equal to the threshold value KLb and smaller than the threshold value KLc, the rotational fluctuation can be minimized by prohibiting the dither control, that is, by not executing the dither control, when the PM deposition amount DPM is small.

The enlarging process does not necessarily need to include a process of enlarging the execution region of the dither control when the PM deposition amount DPM is large. For example, by increasing the correction requirement value when the PM deposition amount DPM is large, it is possible to increase the temperature increasing effect of the dither control and increase the decrease rate of the PM deposition amount DPM in a period in which the current operation region allows for the filter regeneration process.

Regarding PM Deposition Amount

In the above-illustrated embodiment, the PM deposition amount DPM is calculated using a map based on the intake air amount Ga and the differential pressure between the upstream-side pressure Pu and the downstream-side pressure Pd. However, the configuration is not limited to this. For example, the PM deposition amount DPM may be calculated using the above-described map when the intake air amount Ga is larger than or equal to a specified value, and may be estimated based on the engine speed NE, the load factor KL, and the coolant water temperature (coolant temperature THW) and the air-fuel ratio Af of the internal combustion engine 10 when the intake air amount Ga is smaller than the specified value. This can be implemented, for example, as follows. That is, the following sets of map data are stored in the ROM 34: map data having the engine speed NE and load factor KL as input variables and an increase amount of the PM deposition amount per unit time as an output variable; map data having the coolant temperature THW as an input variable and a coolant temperature correction factor as an output variable; and map data having the air-fuel ratio Af as an input variable and an air-fuel ratio correction factor as an output variable. Then, after the CPU 32 obtains the PM deposition increase amount through map calculation, the PM deposition increase amount is multiplied by the coolant temperature correction factor and the air-fuel ratio correction factor to calculate the PM deposition increase amount, which is used to correct the PM deposition amount DPM is successively increased. When the state of the intake air amount Ga is changed from a value larger than or equal to the specified value to a value smaller than the specified value, the initial value of the PM deposition amount DPM only needs to be calculated based on the differential pressure. Also, when the intake air amount Ga is changed from a value smaller than the specified value to a value larger than or equal to the specified value, the PM deposition amount DPM that is calculated based on the differential pressure is used.

Also, the PM deposition amount DPM may be estimated by successively integrating the PM deposition increase amount that has been corrected with the coolant temperature correction factor and the air-fuel ratio correction factor, without using the differential pressure. Alternatively, the PM deposition amount DPM may be detected using a dedicated sensor.

Regarding Dither Control Process

The correction requirement value α may be variably set in accordance with the coolant temperature THW in addition to the engine speed NE and the load factor KL. Further, for example, the correction requirement value α may be variably set based only on two parameters such as the engine speed NE and water temperature THW or the load factor KL and the coolant temperature THW. Also, the injection amount correction requirement value α may be variably set based on only one of the three parameters. Instead of the engine speed NE and the load factor KL are used as parameters for determining the operating point of the internal combustion engine 10. For example, instead of the load factor KL, which is a load, the accelerator operation amount may be used as a load. Alternatively, the correction requirement value α may be variably set in accordance with the intake air amount Ga instead of the engine speed NE.

It is not essential to vary the correction requirement value α based on the above parameters. For example, the correction requirement value α may be a single value for each mode.

In the above-described embodiment, the number of the lean combustion cylinders is greater than the number of the rich combustion cylinders, but the configuration is not limited to this. For example, the number of the rich combustion cylinders and the number of the lean combustion cylinders may be equal to each other. Alternatively, instead of setting all the cylinders #1 to #4 to either a lean combustion cylinder or a rich combustion cylinder, the air-fuel ratio of one cylinder may be set to the target air-fuel ratio. Furthermore, if the cylinder filling air amount remains constant in one combustion cycle, the reciprocal of the mean value of the fuel-air ratios does not need to be the target air-fuel ratio. For example, in the case of four cylinders as in the above-described embodiment, if the cylinder filling air amount remains constant, the reciprocal of the mean value of the fuel-air ratios at five strokes may be used as the target air-fuel ratio. Also, the reciprocal of the mean value of the fuel-air ratios at three strokes may be used as the target air-fuel ratio. However, it is desirable that a period in which both a rich combustion cylinder and a lean combustion cylinder exist in a single combustion cycle occurs at least once every two combustion cycles. In other words, if the cylinder filling air amount remains constant, it is desirable to set the predetermined period to two or fewer combustion cycles when setting target air-fuel ratio to the reciprocal of the mean value of the fuel-air ratios. For example, if the predetermined period is set to two combustion cycles and the rich combustion cylinder exists only once during two combustion cycles, the appearance order of the rich combustion cylinder and the lean combustion cylinder is represented by R, L, L, L, L, L, L, L, where the lean combustion cylinder is represented by R, and the lean combustion cylinder is represented by L. In this case, a period of one combustion cycle that is shorter than the predetermined period and represented by R, L, L, LA is provided, and part of cylinders #1 to #4 is a lean combustion cylinder and the other cylinders are rich combustion cylinders. When the reciprocal of the mean value of the fuel-air ratios of periods different from one combustion cycle is used as the target air-fuel ratio, it is desirable that the amount of air that is drawn into the internal combustion engine in the intake stroke and is blown back to the intake passage before the intake valve closes be negligible.

Regarding Exhaust Purification Device

In the above-described configuration, the three-way catalyst 24 and the GPF 26 are presented as the exhaust gas purification devices, but the configuration is not limited to this. For example, the exhaust gas purification device may be only the GPF 26. In this case, however, it is desirable to impart the oxygen storage capacity to the GPF 26 in order to improve the temperature increasing effect by the dither control.

Regarding Controller

The controller is not limited to a device that includes the CPU 32 and the ROM 34 and executes software processing. For example, at least part of the processes executed by the software in the above-illustrated embodiment may be executed by hardware circuits dedicated to executing these processes (such as ASIC). That is, the controller may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Regarding Internal Combustion Engine

The internal combustion engine is not limited to a four-cylinder engine. For example, an in-line six-cylinder engine may be used. Alternatively, a V engine may be used, which includes a first exhaust purification device and a second exhaust purification device that purify exhaust gas from different cylinders.

Another Modification

The fuel injection valve is not limited to one that injects fuel into the combustion chamber 16, but may be one that injects fuel, for example, into the intake passage 12. The air-fuel ratio feedback control does not necessarily need to be executed when the dither control is executed.

Therefore, the present examples and embodiments are to be considered as illustrative and not restrictive and the disclosure is not to be limited to the examples and embodiments given herein.

The invention claimed is:

1. A controller for an internal combustion engine, the controller being configured to control an internal combustion engine that includes a filter configured to trap particulate matter in exhaust gas discharged from a plurality of cylinders and fuel injection valves provided for the respective cylinders, wherein the controller is configured to execute a dither control process of operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio, and an enlarging process, which includes at least one of the following two processes a process of causing an operation region of the internal combustion engine in which the dither control process is executed to be larger in a case in which an amount of particulate matter trapped by the filter is large than in a case in which the amount is small, and a process of causing a degree of richness of the rich combustion cylinder and a degree of leanness of the lean combustion cylinder to be greater in a case in which the amount of particulate matter trapped by the filter is large than in a case in which the amount of particulate matter trapped by the filter is small.

2. The controller for an internal combustion engine according to claim 1, wherein the controller executes the dither control process in a case in which the amount of the trapped particulate matter is a first amount, an engine speed is a first engine speed, and a load of the internal combustion engine is a first load, the controller is configured to prohibit the dither control process in a case in which the amount of the trapped particulate matter is the first amount, the engine speed is the first engine speed, and the load of the internal combustion engine is a second load, which is smaller than the first load, and the enlarging process includes a process of executing the dither control process while causing the degree of richness of the rich combustion cylinder and the degree of leanness of the lean combustion cylinder to be greater in a case in which the amount of the trapped particulate matter is a second amount, which is larger than the first amount, the engine speed is the first engine speed, and the load of the internal combustion engine is the second load than in a case in which the amount of the trapped particulate matter is the first amount, the engine speed of the internal combustion engine is the first engine speed, and the load of the internal combustion engine is the first load.

3. The controller for an internal combustion engine according to claim 2, wherein the controller is configured to execute, prior to executing the dither control process in a case in which the engine speed is the first ending speed and the load of the internal combustion engine is the second load, a notification process of operating a notification device to notify a possibility that a rotational fluctuation of a crankshaft of the internal combustion engine may increase.

4. The controller for an internal combustion engine according to claim 2, wherein the controller is configured to prohibit the dither control process in a case in which the amount of the trapped particulate matter is the second amount, the engine speed is the first engine speed, and the load of the internal combustion engine is a third load, which is smaller than the second load, and the controller is configured to execute, as the enlarging process, the dither control process while causing the degree of richness of the rich combustion cylinder and the degree of leanness of the lean combustion cylinder to be greater in a case in which the amount of the trapped particulate matter is a third amount, which is larger than the second amount, the engine speed is the first engine speed, and the load of the internal combustion engine is the third load than in a case in which the amount of the trapped particulate matter is the second amount, the engine speed is the first engine speed, and the load of the internal combustion engine is the second load.

5. A method of controlling an internal combustion engine that includes a filter configured to trap particulate matter in exhaust gas discharged from a plurality of cylinders and fuel injection valves provided for the respective cylinders, the internal combustion engine including an electronic control unit programmed to execute control of each step of the method, the method comprising:

executing a dither control process of operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio; and executing an enlarging process, which includes at least one of the following two processes a process of causing an operation region of the internal combustion engine in which the dither control process is executed to be larger in a case in which an amount of particulate matter trapped by the filter is large than in a case in which the amount is small, and a process of causing a degree of richness of the rich combustion cylinder and a degree of leanness of the lean combustion cylinder to be greater in a case in which the amount of particulate matter trapped by the filter is large than in a case in which the amount of particulate matter trapped by the filter is small.

6. A controller for an internal combustion engine, the controller being configured to control an internal combustion engine that includes a filter configured to trap particulate matter in exhaust gas discharged from a plurality of cylinders and fuel injection valves provided for the respective cylinders, wherein the controller comprises processing circuitry, and the processing circuitry is configured to execute a dither control process of operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio, and an enlarging process, which includes at least one of the following two processes a process of causing an operation region of the internal combustion engine in which the dither control process is executed to be larger in a case in which an amount of particulate matter trapped by the filter is large than in a case in which the amount is small, and a process of causing a degree of richness of the rich combustion cylinder and a degree of leanness of the lean combustion cylinder to be greater in a case in which the amount of particulate matter trapped by the filter is large than in a case in which the amount of particulate matter trapped by the filter is small.

* * * * *